United States Patent
Lappeman

(10) Patent No.: US 8,858,794 B2
(45) Date of Patent: Oct. 14, 2014

(54) SEDIMENT COLLECTING CONTAINER

(76) Inventor: Wayne Lappeman, Coral Springs, FL (US)

(*) Notice: Subject to any disclaimer, the term of this patent is extended or adjusted under 35 U.S.C. 154(b) by 599 days.

(21) Appl. No.: 13/238,561

(22) Filed: Sep. 21, 2011

(65) Prior Publication Data

US 2012/0067807 A1    Mar. 22, 2012

Related U.S. Application Data

(60) Provisional application No. 61/403,860, filed on Sep. 22, 2010.

(51) Int. Cl.
| | |
|---|---|
| *B01D 35/027* | (2006.01) |
| *B01D 35/04* | (2006.01) |
| *B01D 36/04* | (2006.01) |
| *B65F 1/02* | (2006.01) |
| *B01D 21/00* | (2006.01) |
| *B01D 21/24* | (2006.01) |
| *B01D 29/15* | (2006.01) |
| *B01D 29/52* | (2006.01) |

(52) U.S. Cl.
CPC .............. *B65F 1/02* (2013.01); *B01D 35/027* (2013.01); *B01D 35/04* (2013.01); *B01D 21/0012* (2013.01); *B01D 21/003* (2013.01); *B01D 21/2483* (2013.01); *B01D 29/15* (2013.01); *B01D 29/52* (2013.01); *B01D 2201/306* (2013.01); *B01D 2221/12* (2013.01); *B65F 2210/132* (2013.01)
USPC ........... 210/300; 210/241; 210/305; 210/307; 210/311; 210/312; 210/455; 210/482

(58) Field of Classification Search
CPC ...... B01D 35/027; B01D 35/04; B01D 36/04; B01D 2201/306
USPC ......... 210/300, 241, 305, 307, 311, 312, 482, 210/455
See application file for complete search history.

(56) References Cited

U.S. PATENT DOCUMENTS

| | | | | |
|---|---|---|---|---|
| 175,804 | A * | 4/1876 | Wilder | 210/473 |
| 788,833 | A * | 5/1905 | Jackson | 210/102 |
| 1,453,169 | A * | 4/1923 | Packer | 210/317 |
| 2,101,978 | A * | 12/1937 | Boosey | 210/300 |
| 2,649,965 | A * | 8/1953 | King et al. | 210/241 |
| 4,069,143 | A | 1/1978 | Friesenborg et al. | |
| 4,929,353 | A * | 5/1990 | Harris | 210/237 |
| 5,234,309 | A * | 8/1993 | Foster | 414/525.9 |
| 5,589,081 | A | 12/1996 | Harris | |
| 5,595,654 | A * | 1/1997 | Caughman, Jr. | 210/323.1 |
| 5,707,535 | A | 1/1998 | Harris | |
| 6,004,461 | A | 12/1999 | Harris | |
| 6,379,541 | B1 | 4/2002 | Nicholas | |
| 7,291,262 | B2 * | 11/2007 | Matsui et al. | 210/170.03 |

* cited by examiner

*Primary Examiner* — Thomas M Lithgow
(74) *Attorney, Agent, or Firm* — Robert M. Downey, P.A.

(57) ABSTRACT

A waste/sediment collecting container has a front vertical wall, a back vertical wall, two side vertical walls, and a sloped bottom surface. Along the lowest portion of the sloped floor surface lays a debris grate which allows water and pieces of sediment to pass through (but prevents larger pieces of waste from passing). The collection container includes a sump directly beneath the debris grate for collecting heavy sediment which passes through the grate. Sloped walls along the sides of the sump lead to U-traps on both sides of the container that allow liquid to pass through but prevent any solid waste from leaving the sump. Solid waste may be removed from the sump by removing the threaded service cap from the drain hole. Located beyond the traps are filter chambers having drain holes for inserting sediment filters which liquid passes through and exits the container.

6 Claims, 5 Drawing Sheets

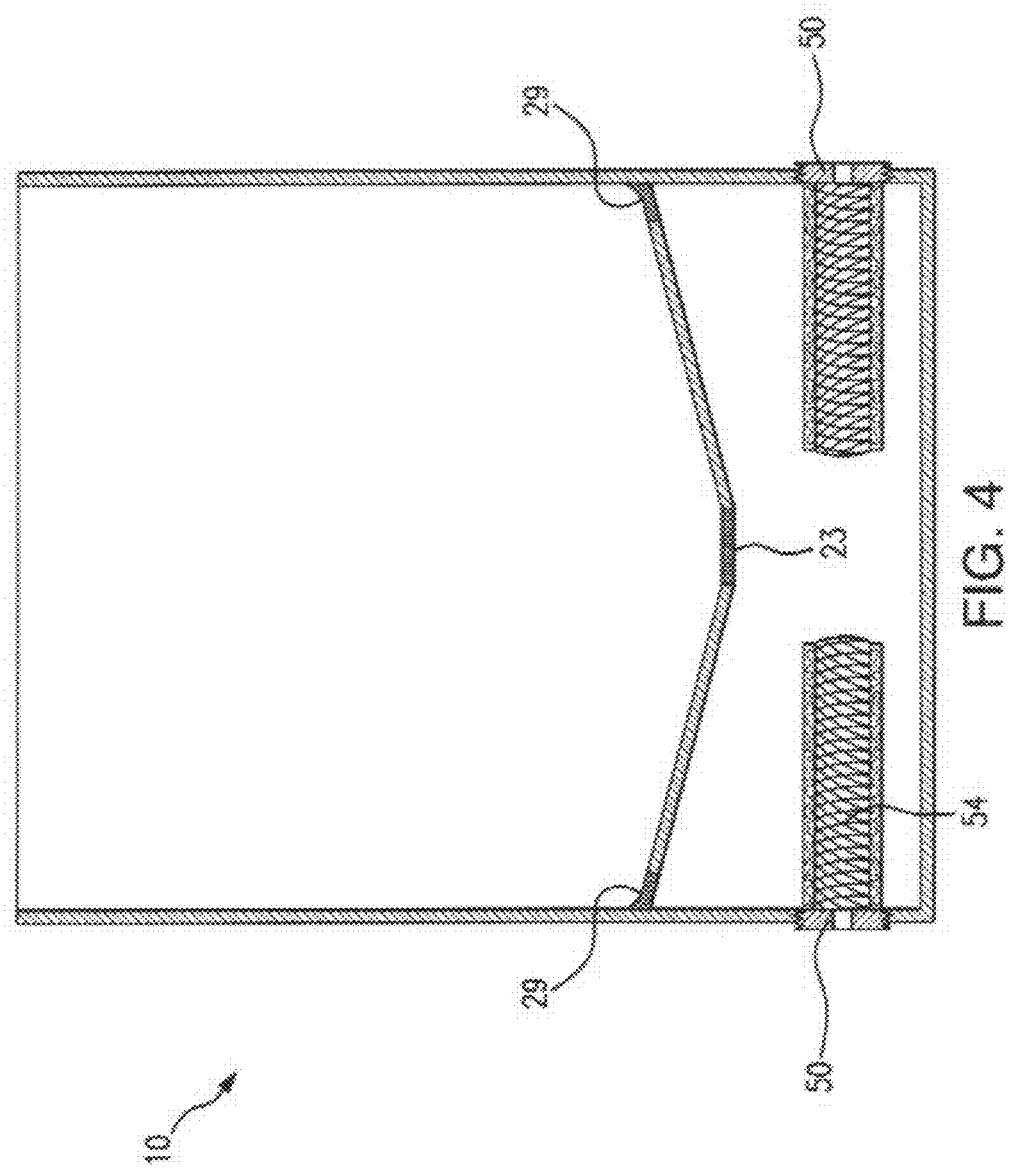

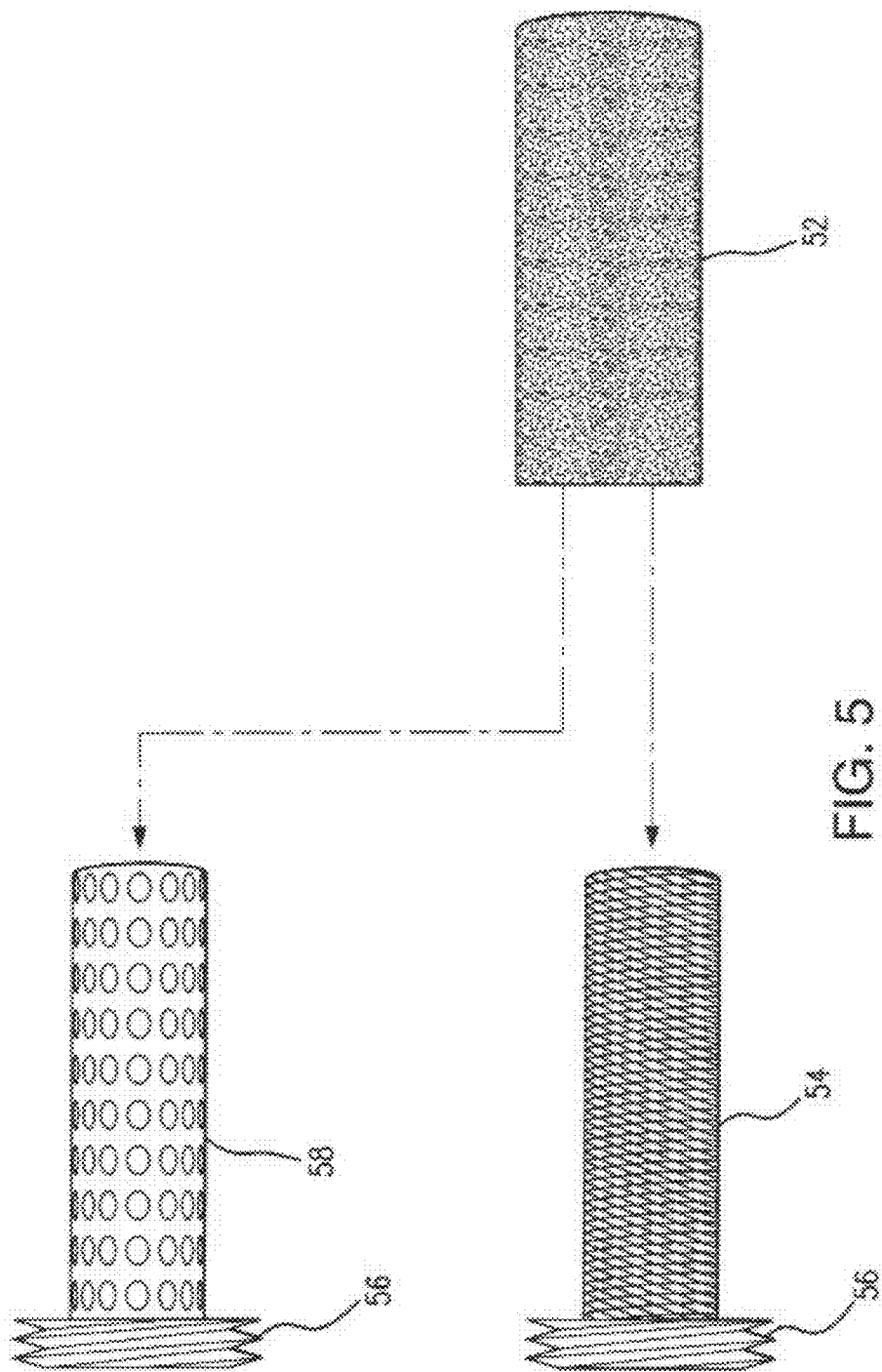

SEDIMENT COLLECTING CONTAINER

BACKGROUND

This non-provisional patent application is based on provisional patent application Ser. No. 61/403,860 filed on Sep. 22, 2010.

The embodiments described herein relate to waste containers.

Waste collection containers (or dumpsters) are used for storing large volumes of waste. They are usually placed at locations where more waste management is needed, such as at a construction site or next to a large building, etc. All manner of waste are stored in these waste collection containers, much of which can be harmful and polluting if it escapes the container into the environment. Under normal conditions, this usually is not a problem, especially if the container has a cover and people are careful not to overfill it.

However, when it rains and rainwater begins to fill up a waste collection container, problems arise because of the heavy pollutant liquid which forms. With enough rain, this polluted rainwater may pour out of the waste collection container and harm the nearby environment. Waste collection containers which have filled with rainwater become potential health risks for all nearby people and for the nearby environment.

In light of the shortcomings and dangers posed by current waste collection containers, there is a desperate need for a waste collection container that effectively filters the pollutant liquid that forms when rainwater enters the waste collection container and that slowly pours out this filtered liquid so that the container does not pose a threat to any persons who approach the container or to the nearby environment.

While certain aspects of conventional technologies have been discussed and presented to facilitate disclosure of some embodiments, Applicants in no way disclaim these technical aspects, and it is contemplated that the attached claims may encompass one or more of the conventional technical aspects discussed herein.

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is it known to be relevant to an attempt to solve any problem with which this specification is concerned.

SUMMARY

Some embodiments may address one or more of the problems and deficiencies discussed above. However, it is contemplated that some embodiments may prove useful in addressing other problems and deficiencies in a number of technical areas. Therefore the claims should not necessarily be construed as limited to addressing any of the particular problems or deficiencies discussed herein.

Some embodiments may include a waste/sediment collection container having a front, back, and two side vertical walls, and a sloped floor surface. Along the lowest portion of the sloped floor surface lays a debris grate which allows water and pieces of sediment to pass through (but prevents larger pieces of waste from passing). The collection container includes a sump directly beneath the debris grate for collecting heavy sediment and liquids which passes through the grate. Sloped walls along the sides of the sump lead to a U-trap on both sides of the container. Located beyond the traps are circular holes built into the front surface of the waste collection container for inserting sediment filters.

Rainwater which enters the waste collection container through its open top will pass through the waste in the container and through the debris grate in the bottom tapered surface. Some amount of small pieces of waste, sediment, oils etc. will also pass through the debris grate. However, the grate acts as a first filter in keeping larger pieces of waste from passing through. The second filter is the heavy sediment sump. Heavy sediment, larger pieces of debris etc. will sink to the bottom of the sump where it will remain until it can be removed through a service cap on the bottom of the sump. Rainwater and possibly other pieces of small, floating debris will fill the sump until enough has poured in to raise the water level to the U-traps. The traps act as the third filter and will allow water to siphon through; however any floating debris will remain at the entry of the U-trap and will be unable to leave the sump until removed by a service person. Water which does pass through the U-trap will be passed through a drain hole in the front wall of the container after passing through a fourth filter. This fourth filter will include a sediment filter pad which will cover a filter insert such as a metal screen micron filter. The filter insert will include a treaded cap for attaching and removing the filter for cleaning.

An advantage provided by certain embodiments is a healthier and safer means of collecting waste which will not pollute the nearby environment.

These and other advantages of some embodiments are more readily apparent with reference to the detailed description and accompanying drawings.

BRIEF DESCRIPTION OF THE DRAWINGS

For a fuller understanding of the nature of some embodiments, reference should be made to the following detailed description taken in conjunction with the accompanying drawings in which:

FIG. 4 is a side elevational view shown in cross section of the sediment collecting container according to an embodiment.

FIG. 5 is a perspective view of the filter device according to an embodiment.

Like reference numerals refer to like parts throughout the several views of the drawings.

DETAILED DESCRIPTION OF SOME EMBODIMENTS

Figure 1:
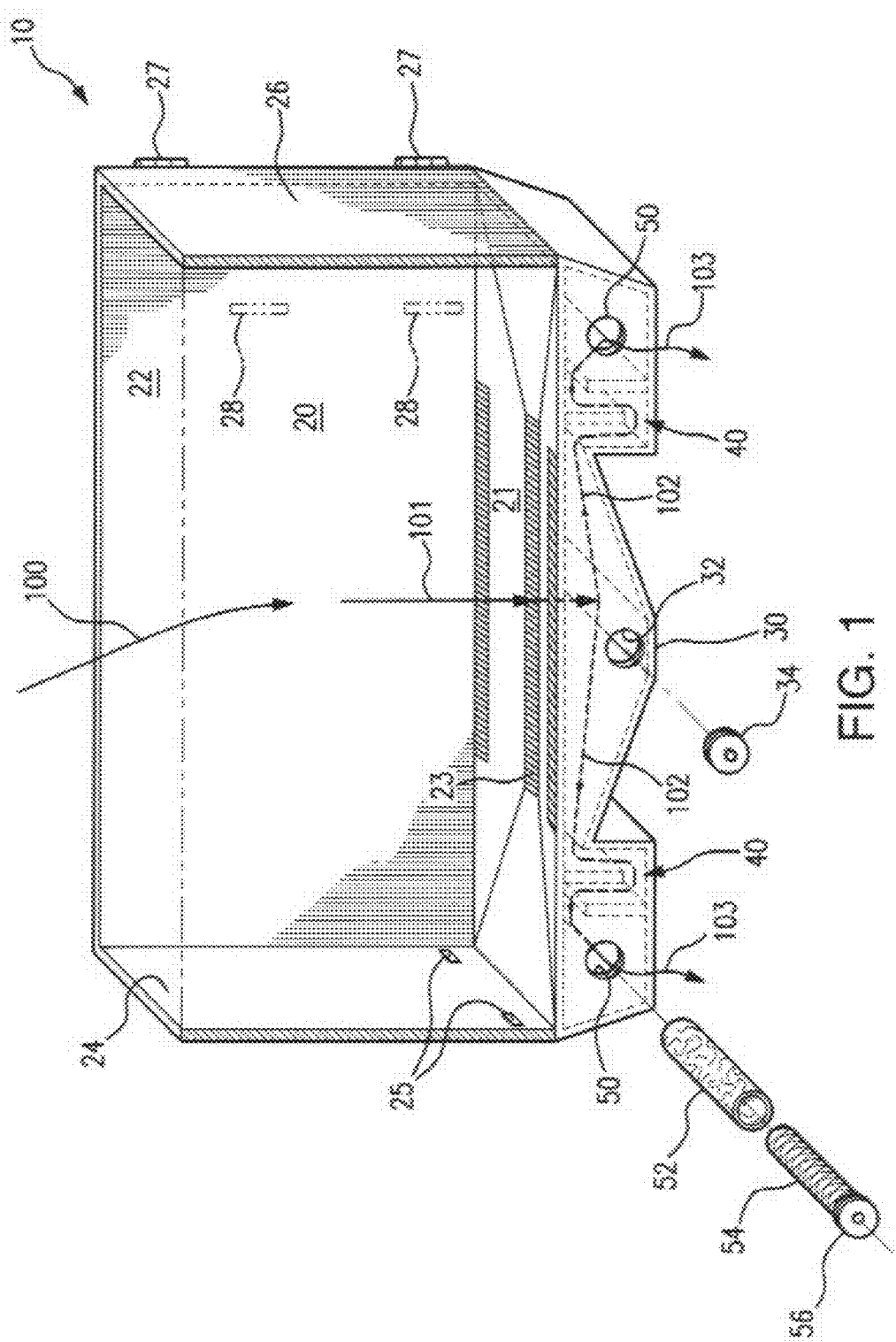
FIG. 1 is a perspective view of the sediment collecting container in partial cross-section according to an embodiment.
Figure 2:
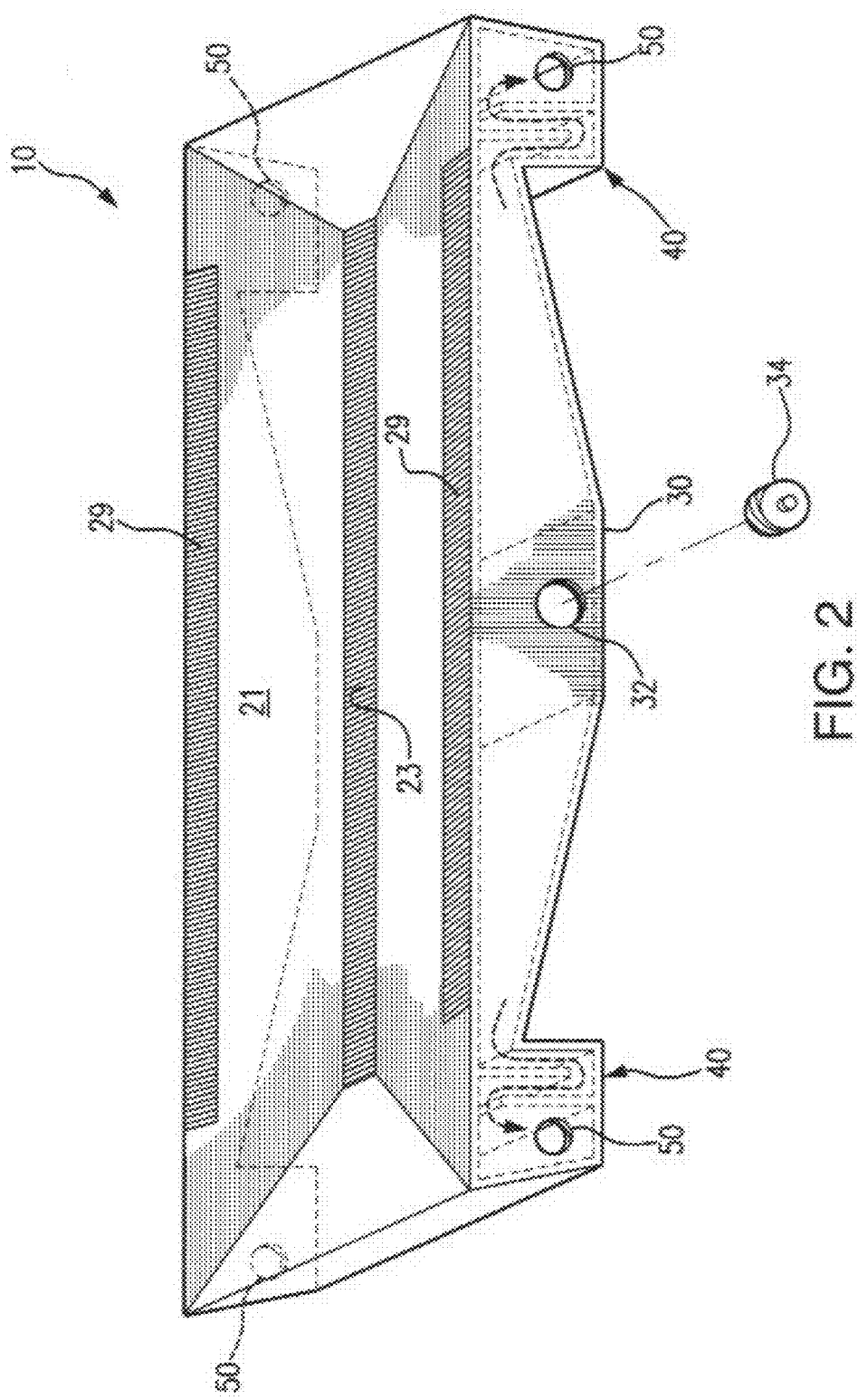
FIG. 2 is an isolated top perspective view of the sediment collecting container in partial cross-section according to an embodiment without showing the side walls.
Figure 3:
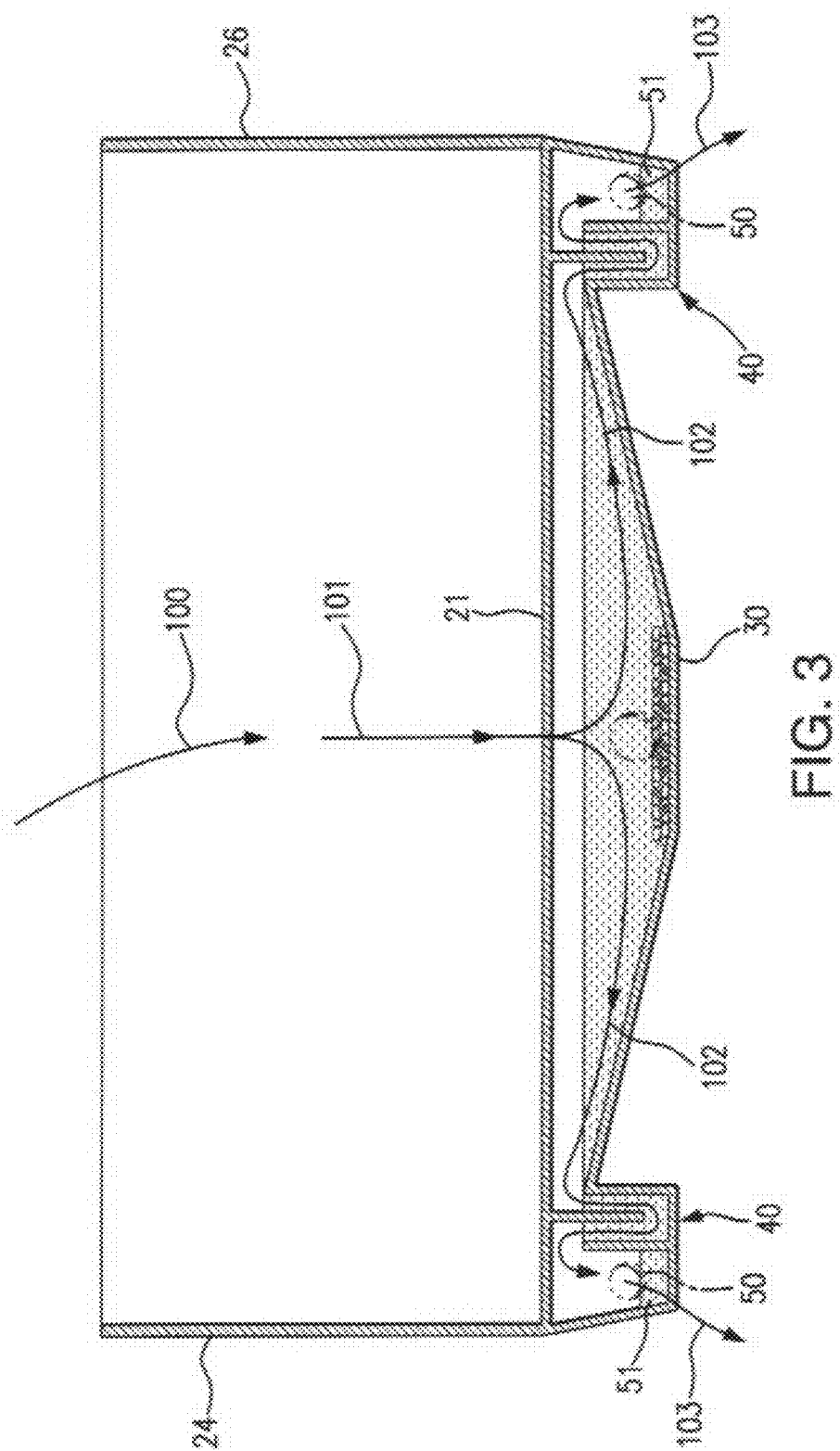
FIG. 3 is a front elevational view of the sediment collecting container in partial cross-section according to an embodiment.

The attached claims and their legal equivalents can be realized in the context of embodiments other than the ones used as illustrative examples in the description herein.

Referring to the several views of the drawings, the sediment collecting container is shown in accordance with some embodiments. In each of these embodiments, the sediment collecting container is generally indicated as 10.

Reference is now made to FIG. 1-4. The sediment collecting container 10 has a front wall 20, a sloped floor surface 21, a rear wall 22, and side walls 24 and 26. A side wall 24 may include loading slots 25 for receiving prongs from a front-loading waste-collection vehicle. A side wall 26 may also be fitted with hinges 27 and latches 28 so that the wall 26 may define a door 26 that may swing open, allowing waste to be removed from the interior waste-storage space. The sloped floor surface 21 includes a drain grate 23 along its lowest portion and one or more liquid-disposal drains 29 along its upper-most portions.

Drain grate 23 leads to a sediment-collecting sump 30 built into the bottom portion of the container 10 and located beneath the drain grate 23 and the sloped floor surface 21. Sump 30 includes a drain hole 32 and a threaded cap 34 which fits securely into drain hole 32. A service person may remove threaded cap 34 from the drain hole 32 in order to remove any heavy sediment which has collected in the sump 30.

On both sides of the sump 30 are U-traps 40. U-traps 40 are well known as a filtering mechanism and will prevent any small floating debris from leaving the sump 30. Adjacent to the U-traps 40 are filtering chambers 51 which include drain holes 50. A sediment-filtering sock 52 is fitted securely over a filter insert 54 (e.g. a metal screen micron filter) which then fits into the drain hole 50. Drain hole 50 is threaded and receives the threaded cap 56 attached to the filter insert 54. Threaded cap 56 includes a small drain hole 57 for releasing filtered water. This filtered water is always poured out once the water levels within the filter chambers 51 are high enough.

As shown in FIG. 1, the rainwater enters the container 10 in step 100. It mixes with any waste within the container 10 and then proceeds through the drain grate 23 in step 101. It is poured through the drain grate 23 and into the sediment-collecting sump 30 along with any other waste that is small enough to pass through the grate 23. All heavy (i.e. not able to float in water) sediment remains at the bottom of the sump 30. The floating debris and oils all remain at the upper surface of the liquid within the sediment-containing sump 30 and eventually, with enough rainwater, the liquid proceeds through the U-traps 40 in step 102. U-traps 40 keep floating debris and oils within the sump 30 while allowing the rainwater to pass through to the filter chamber 51. Once in the filter chamber 51, rainwater will continue to accumulate until it raises high enough to be filtered by the filter insert 54. Rainwater which passes through the filter insert 54 in step 103 will then be automatically passed through the small drain hole 57 within the insert 54 where it will return to the environment. The rainwater exiting the container 10 in step 103 will be sufficiently clean that it will not harm the environment. This method will prevent excessively polluted water from accumulating within the container 10 and then spilling into the environment.

Additional reference is now made to FIG. 5. The sediment-filtering sock 52 may either cover a metal screen micron filter insert 54 or a sock-supporting insert 58, depending on situational requirements or preferences. The use of a micron filter insert 54 provides higher quality filtering of the liquid passing through, however the sock-supporting insert 58 will support the sediment-filtering sock 52 and may allow faster disposal of the liquid compared to using the micron filter insert 54. The micron filter insert 54 and the sock-supporting insert 58 include the threaded cap 56 for securing to the drain hole 50.

Throughout the detailed description and the accompanying drawings enclosed herein, some embodiments have been shown, described and detailed, wherein a variety of possible elements and/or features may be formed and configured in different ways. Accordingly, any and all possible combinations of the elements and/or features described in accordance with these various embodiments may be desirable to manufacturers and/or may help to more successfully meet customers' specific needs and/or preferences. Consequently, any and all possible combinations of the features or elements of one embodiment or more than one embodiment or all embodiments mentioned herein are fully considered within the spirit and scope of the attached claims and their legal equivalents.

Thus, some embodiments of a sediment collecting container have been disclosed. Other embodiments are contemplated and envisioned, and therefore it is recognized that departures from the embodiments described in this disclosure may certainly exist within the spirit and scope of the attached claims and their legal equivalents. Those having an ordinary skill in the will envision other possible variations and modifications to features and/or elements of the embodiments, and they will envision other possible embodiments, all of which may fall within the spirit and scope of the attached claims. The spirit and scope of the attached claims is therefore NOT limited by the descriptions and illuminations of the embodiments that have already been presented, but rather the spirit and scope can only be defined by the attached claims and their legal equivalents as interpreted under the doctrine of equivalents. Variations, alternatives, adjustments, modifications, tunings, and deviations from the embodiments of the instant disclosure are fully contemplated and envisioned within the spirit and scope of the attached claims.

What is claimed is:

1. A sediment collecting container for draining and filtering liquids from solid waste comprising:
   a sloped floor surface;
   one or more side walls extending upwardly from the sloped floor surface defining a waste collection portion within the side walls and above the sloped floor surface;
   a drain grate along the lowest portion of the sloped floor surface;
   a sediment-collecting sump located directly beneath the sloped floor surface and the drain grate, the sediment-collecting sump having at least one sloped bottom wall;
   a U-trap adjacent to at least one end of the sediment-collecting sump, the U-trap being structured and disposed for allowing liquids to leave the sediment-collecting sump while solid sediment remains in the sediment-collecting sump;
   at least one filtering chamber located adjacent to the U-traps for receiving liquid that leaves the sediment-collecting sump and passes through the U-traps, the filtering chambers including at least one drain hole for releasing the received liquids; and
   a filter device having a liquid filter and a cap, the liquid filter being sized and configured for passage through the drain hole and into the filtering chamber, the cap having a hole thereon for releasing liquid that passes through the filter, the cap being structured and disposed for attachment to the drain hole with the liquid filter received within the filtering chamber.

2. The sediment collecting container as recited in claim 1 wherein the sediment-collecting sump further includes a drain hole for releasing sediment from the sediment-collecting sump.

3. The sediment collecting container as recited in claim 2 wherein the drain hole of the sediment-collecting sump is threaded and the container further includes a threaded cap that fits securely into the threaded drain hole, the threaded cap being removable in order to drain out any sediment from the sediment-collecting sump.

4. The sediment collecting container as recited in claim 3 further including a sediment filter located adjacent to the liquid filter of the filter device.

5. The sediment collecting container as recited in claim 4 further including one or more liquid-disposal drains along the upper-most portion of the sloped floor surface that allow liquid in the sediment-containing sump to release out of the sump when the container is inverted by waste collection personnel.

6. The sediment collecting container as recited in claim 4 wherein the liquid filter is a metal screen micron filter.

\* \* \* \* \*